April 21, 1925.
J. McLEOD
1,534,797
APPARATUS FOR LOADING MERCHANDISE INTO VEHICLES
Filed Oct. 8, 1923
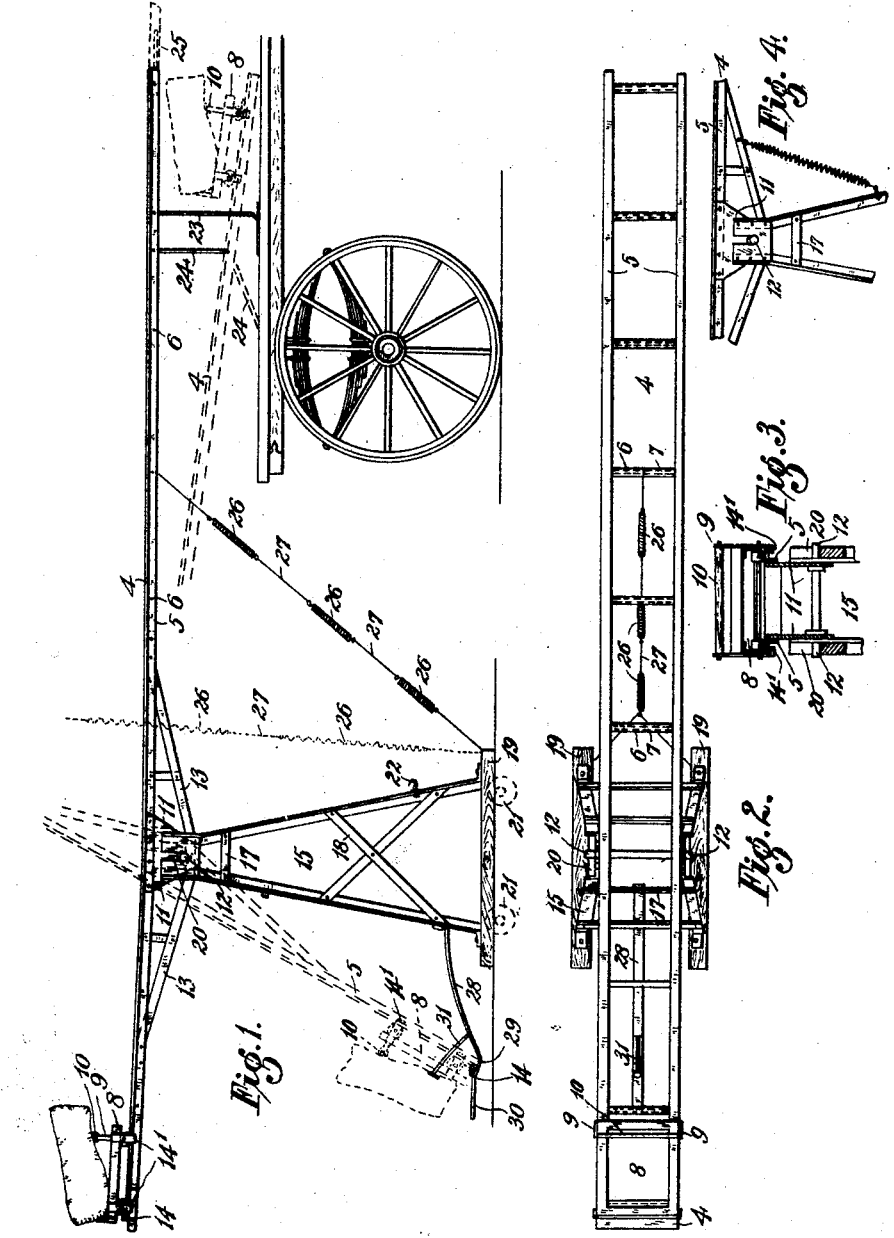
JOHN McLEOD
INVENTOR.
By
his Attorney Patented Apr. 21, 1925.

1,534,797

UNITED STATES PATENT OFFICE.

JOHN McLEOD, OF STAWELL, VICTORIA, AUSTRALIA.

APPARATUS FOR LOADING MERCHANDISE INTO VEHICLES.

Application filed October 8, 1923. Serial No. 667,127.

*To all whom it may concern:*

Be it known that I, JOHN McLEOD, a subject of the King of Great Britain, residing at Stawell, in the State of Victoria, Commonwealth of Australia, have invented new and useful Improvements in Apparatus for Loading Merchandise into Vehicles, of which the following is a specification.

This invention relates to an improved apparatus for loading bagged grain, tubers or other agricultural products and merchandise into farm waggons, railway trucks and other conveyances.

The primary object of the invention is to provide an apparatus of such character as will enable loading operations to be performed more expeditiously than hitherto, and with less labor than is found essential with other loading appliances now in use and known to me.

According to my invention, I provide a loading apparatus that consists essentially of a tower structure, upon which is pivotally mounted a cantilever frame constructed as a trolley track, a trolley adapted to travel freely from end to end of said track, and means for controlling the lowering and raising of said cantilever frame from the waggon or other vehicle for the purpose of controlling the travel of the loaded trolley to said waggon or vehicle, and its return travel for re-loading. The apparatus is self-contained and can be readily moved from one location to another, which is of advantage during the progressive loading of a vehicle.

Reference is had to the accompanying drawings, wherein:—

Figure 1 is a view in side elevation illustrating a representative form of my invention for loading farm waggons and like vehicles, a bag of grain being shown upon the trolley mounted upon a track in elevated position prior to its travel along said track for automatic delivery into a vehicle—broken lines indicating the loading and discharge positions of said track and said trolley.

Figure 2 is a view in plan of Figure 1.

Figure 3 is a detail sectional view of the upper portion of the cantilever track frame and the trolley conveyor.

Figure 4 is a detail view illustrating modified arrangement of counter-balance spring for the cantilever track.

In these views, the numeral 4 designates a cantilever frame comprising a pair of longitudinal parallel bars 5 constructed of angle-section metal, which are rigidly secured together at a requisite distance apart by means of tubular distance pieces 6 and transverse bolts 7 that are passed through said distance pieces. The parallel bars of angle-metal function as rails for a trolley conveyor 8 which is mounted upon said cantilever frame, and is adapted to support bagged grain or other produce or merchandise of bulky or heavy character.

A vertical bracket 9 is secured to the forward end portion of each side beam of the trolley, and revolvably supported in said brackets is a transverse roller 10 adapted to support the bagged grain or other produce at an angle to the horizontal as seen in Figure 1.

The cantilever track frame 4 is provided with depending cheek plates 11, in which is fixedly secured a transverse pin 12 having its ends projecting outwardly beyond said cheek plates.

The parallel bars 5 of the track frame are braced and strengthened about the pivot pin 12 by appropriate stay members 13 while the outer or loading end of said frame is furnished with a stop or stops 14 to prevent the trolley 8 running off the frame when the same is in its lowered position for loading. Depending from the trolley frame are L-shaped guides $14^1$ which extend beneath the horizontal flanges of the track bars 5 to maintain the trolley in constant running position on the track frame.

A tower structure 15, preferably constructed of angle-section metal and having frame connecting pieces 17 and braces 18, is mounted upon a base 19 that is ordinarily constructed of wood. This tower is of greater height than the waggon or conveyance to be loaded, and it has on each side at its upper end portion a slotted bearing 20 to revolvably and detachably accommodate the projecting ends of said pivot pin 12. If desired, said tower may be mounted upon wheels or rollers 21 as indicated by broken lines in Figure 1 to facilitate the movement of the loading apparatus as a unit from one location to another, and hooks 22 are affixed to said tower frame for connection with the attachment ends of haulage ropes or chains when the apparatus is to be transported from one location to another.

The cantilever track frame 4 is furnished with a pull-chain or cord 23 attached adjacent to its delivery end, by means of which device it can be manually actuated and loading operations conveniently controlled by an operator within the waggon or other vehicle, while a prop 24 may also be pivotally attached to said cantilever frame to support its delivery end at a required height above the waggon should the same be found necessary or desirable at any time during loading operations.

A slotted extension 25 may also be fitted to each of the longitudinal bars 5 of the trolley track for the purpose of length adjustment, and appropriate locking devices (not shown) may be provided to retain said extensions in selected positions.

A compensating or counter-balance spring is provided to facilitate the elevation of the loading end of the cantilever track frame, with a loaded trolley thereon, to a required height whereby said trolley with its load will gravitate freely along the track and deliver the bag of grain or other load to the operator within the waggon.

This counter-balance or compensating spring device as seen in Figure 1 comprises a series of coiled tension springs 26, which are connected together at their opposing ends by flexible cords 27, while the outer springs of the series are anchored to the base of the tower frame and to the cantilever track frame, respectively. As is illustrated in Figure 4, there may be employed only one compensating or counterbalance spring 26 having one end attached to the cantilever frame at a point in close proximity to its supporting tower while its other end is connected to an upright of said tower frame.

In order to maintain the short loading end of the cantilever track frame in its lowered position against the tension of the spring device 26 and with the trolley 8 mounted on said track frame in readiness to receive a bag of grain or like produce, I provide a spring latch device which is adapted to automatically engage and hold the loading end of the cantilever track frame immediately the same is brought to its lowered position.

This spring latch device comprises a flat metal bar 28 which is supported from the tower frame 15 so as to have a spring action, and its opposite end is furnished with an upwardly inclined member 29 functioning as a latch adapted to engage the end of said cantilever track frame when the same is lowered to the position indicated by broken lines in Figure 1. The metal bar 28 has an approximately horizontal extension 30, serving as a pedal for foot-release of said latch, if so required.

Fixedly secured to said flat bar 28 adjacent to the latch 29 is an upwardly projecting rod 31 which is of such length that when the loading end of the cantilever track frame is lowered in the manner described, it extends through said track frame and between the frame members of said trolley so as to project slightly beyond the upper edges of the latter.

In use, the loading apparatus is conveyed to a required location adjacently to the stack of bagged grain or other produce and having the long end of the pivoted cantilever track frame 4 above and in central alignment with the waggon to be loaded. The short end of said track frame, on which the trolley 8 is now located, is lowered against the tension of the spring 26 until in close proximity to the ground (or a loading stage) when said short end will be automatically engaged and held in position by the operation of the spring latch 29. The opposite end of the pivoted cantilever frame 4 is at this time in elevated position.

One operator places the bagged material upon the trolley conveyor 8 with the forward end of the bag supported by the roller 10 at an inclination to the horizontal. The weight of the bagged material pressing upon the rod 31 depresses the flat metal bar 28 supported from the tower frame 15 thus automatically releasing the short end of said track frame from said latch. Another operator standing within the waggon or vehicle exerts a downward pull on the pull cord 23 attached to the elevated end of the cantilever track frame 4. By the exertion of this downward pull, facilitated by the tension of the spring device 26, the loaded trolley can be conveniently levered to an elevated position to enable it to travel along the track by gravitation and discharge the load into the waggon or vehicle at a required location therein. By reason of the revolvable roller 10 arranged at a higher level than the front portion of the trolley the bagged grain or other produce, when being delivered into the waggon, is automatically canted instead of being flat, thereby conducing to the performance of stacking operations very readily and requiring but a minimum amount of labor.

After the waggon has been loaded with several rows of bagged produce, the inclination of the pivoted track frame 4 is or may be such that the trolley 8 will not travel gravitationally from the loading end to the delivery end of the track. Under these conditions and when the load has been elevated, the operator who is stationed on the ground exerts a thrust with one hand on the trolley or the bag deposited thereon causing the necessary travel for delivery to the operator who is located on the waggon, and the provision of the supporting roller 10 enables the bag to be readily removed for loading placement.

The upward movement that is imparted to the long end of the pivoted track frame 4 causes the trolley 8 to be automatically returned to its initial position for the next loading operation without any appreciable loss of time. The tower 15 is capable of being conveniently moved from one position to another to meet the requirements of progressive loading within the waggon and also to save time and labour to the operator who is engaged in handling the bagged grain or other produce that is stacked upon the ground or upon a platform in readiness for loading in the manner described.

The cantilever track frame 4 may be furnished with a plurality of transversely arranged pivot pins or rods as 12, each of which is adapted to be accommodated within the slotted bearings 20, whereby the leverage exerted on the short end of said track frame to initially elevate the trolley with its load can be adjusted to meet any special loading requirements.

What I do claim is:—

1. A loading apparatus comprising a tower, a cantilever track frame pivotally supported at an intermediate point on said tower to form a relatively short loading end and a relatively long delivery end, a trolley mounted on said track frame and adapted to travel to and fro thereon by gravitation, means for lowering the long end of said track frame, whereby said trolley with its load is initially levered upwardly to a point higher than the waggon being loaded, and then travels by gravitation from the loading end to the delivery end of said track frame, a latch on said tower to engage the loading end of the pivoted track frame, when lowered, and means to automatically release said latch by the weight of the load deposited on the trolley.

2. A loading apparatus according to claim 1, wherein the latch has an upwardly extending rod that is depressed by the weight of the load deposited on the trolley to automatically release said latch.

3. A loading apparatus according to claim 1, wherein a compensating spring is arranged between the pivoted track frame and its supporting tower.

4. A loading apparatus according to claim 1, wherein the pivoted track frame is constructed of angle-section metal bars having tubular spacing members, through which bolts are passed.

In testimony whereof I affix my signature in the presence of two witnesses:

JOHN McLEOD.

Witnesses:
A. J. CALLINAN,
J. E. DELBRIDGE.